Dec. 17, 1935.   C. A. CAMPBELL   2,024,335
AIR BRAKE
Filed Oct. 13, 1933
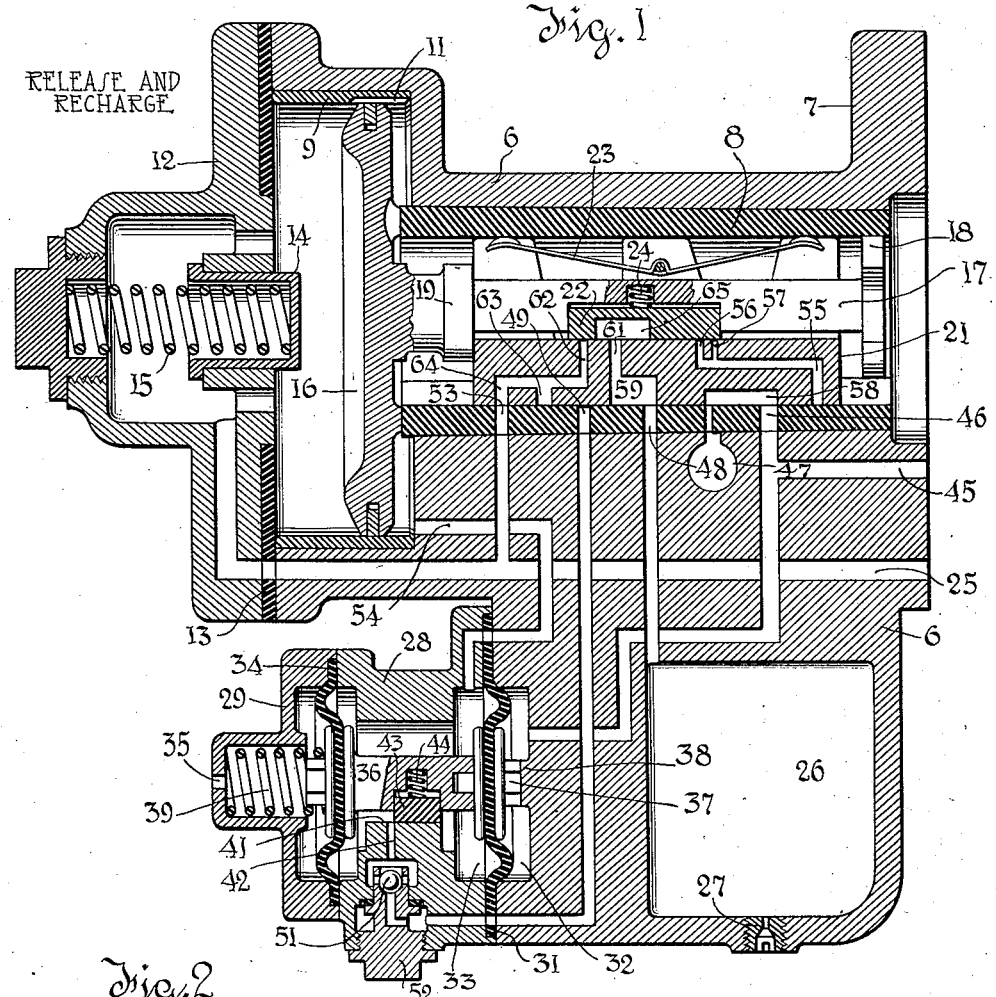
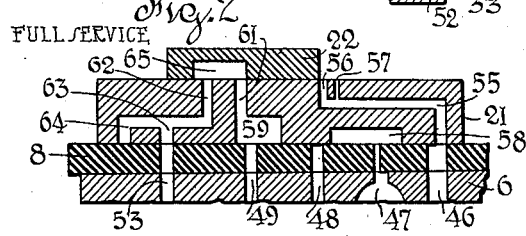
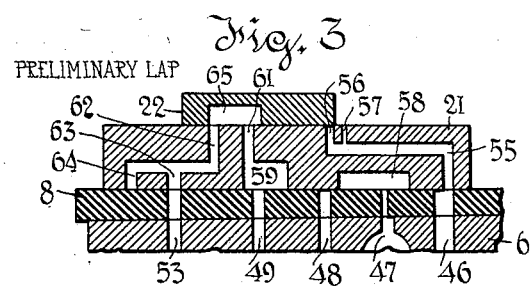
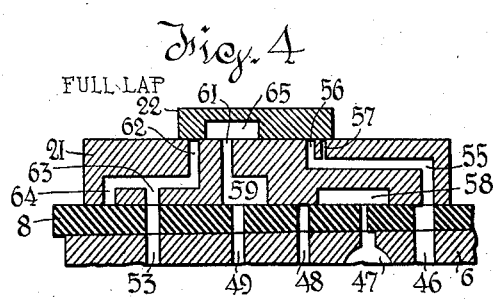
Inventor
Charles A. Campbell
Attorneys Patented Dec. 17, 1935

2,024,335

UNITED STATES PATENT OFFICE 2,024,335

AIR BRAKE

Charles A. Campbell, Watertown, N. Y., assignor to The New York Air Brake Company, a corporation of New Jersey Application October 13, 1933, Serial No. 693,522

16 Claims. (Cl. 303—38)

This invention relates to air brakes, and particularly to means for insuring adequate service application at the ends of long trains, regardless of the presence of brake pipe leakage and the resulting brake pipe pressure taper.

An important feature of the invention is the attainment of the desired result without impairing the releasing characteristics of the triple valve.

On long freight trains, brake pipe leakage has the effect of reducing brake pipe pressure progressively from the front to the rear of the train. As a result of this, the auxiliary reservoirs at the rear of the train are not fully charged, and, when a normal service reduction is made at the engineer's brake valve, the brakes at the forward end of the train apply normally, while, toward the rear of the train, the application is progressively lighter and lighter. The effect is harsh slack action with resulting damage to rolling stock and lading.

It has heretofore been proposed to supplement brake cylinder pressure at the rear of the train by providing for the flow of brake pipe air to the brake cylinder. Devices of this character are defective, in that they impair the releasing action of triple valves at the rear of the train. For example, if a brake cylinder be leaky, the prior art device would feed brake pipe air to counteract the leakage, with the result that it would become difficult, if not impossible, to cause the triple valve to shift to release position.

The present invention provides means for insuring, on the first service graduation, an adequate initial development of service pressure in the brake cylinder. On cars where the flow from the auxiliary reservoir is adequate, auxiliary reservoir air alone flows to the brake cylinder. On cars where the flow of auxiliary reservoir air is inadequate to establish the desired minimum pressure, supplemental flow from the brake pipe occurs.

The invention contemplates means to keep the triple valve from moving to full lap position until the desired minimum pressure is attained in the brake cylinder and to insure motion to lap position when such pressure is attained. Motion to lap position is availed of to terminate the flow from the brake pipe to the brake cylinder, so that, when a triple valve has moved to lap position, it is conditioned for releasing action exactly as it would be if the apparatus for feeding brake pipe air to the brake cylinder were not present. From this it follows that even a leaky brake cylinder will not impair the releasing action of the triple valve once the desired minimum brake cylinder pressure has been established.

The invention involves broad general principles and is applicable to triple valve structures of the most elaborate and refined character, but, for purposes of explanation, I shall describe its embodiment in a triple valve structure of the simplest type. It is to be expressly understood, however, that the invention is of general application and that the specific embodiment chosen for explanation is intended to be illustrative and not limiting.

In the drawing:—

Fig. 1 is a vertical axial section of a simple form of triple valve with the present invention applied. The valve is shown in release position.

Fig. 2 is a fragmentary section, similar to a portion of Fig. 1, showing the slide valve seat, slide valve, and graduating valve in full service position.

Fig. 3 is a similar view, showing the parts in preliminary lap position.

Fig. 4 is a similar view showing the parts in full lap position.

Referring first to Fig. 1, the body of the triple valve is indicated at 6 and has a bolting flange 7 for attachment to an auxiliary reservoir of ordinary form not shown. The slide valve chamber which communicates directly with the auxiliary reservoir is provided with the usual valve chamber bushing 8, the bushing being formed on its lower side with the usual seat for a slide valve. There is also the usual cylinder bushing 9 provided with a charging groove 11. The front cap 12 is sealed to the body 6 by means of a front cap gasket 13 of familiar form. Mounted in the front cap is a graduated stop 14 and graduating spring 15, these parts being of conventional form and the stop being so limited in its motion that it will assist in shifting the triple piston from the full service position of Fig. 2 to the preliminary lap position of Fig. 3 but not to the full lap position of Fig. 4.

The triple piston 16 is of usual construction and has a stem 17 guided by a spider 18, the spider working in the valve chamber bushing 8. Between the spider 18 and collar 19 the main slide valve 21 is positioned so as to have limited lost motion relatively to stem 17.

Coacting with a seat formed on the back of slide valve 21 is a graduating valve 22 which is closely confined in a notch in the stem 17. The slide valve is urged to its seat by the usual bow spring 23 and the graduating valve is urged to its seat by a coiled compression spring 24. The brake pipe passage is indicated at 25 and communicates with the brake pipe as usual and also with the space on the outer side (left side in the drawing) of piston 16.

Formed in the body 6 is a quick service measuring chamber 26 which is vented to atmosphere at a restricted rate through a choke port formed in the interchangeable fitting 27. The purpose of using an interchangeable fitting is to permit the size of the choke port to be changed to provide any desired bleeding rate.

Bolted against a mounting face on the lower portion of the body 6 is the housing 28 of a diaphragm valve mechanism. The outer end of the body 28 is closed by a cap 29. The body 6 and the housing 28 on their meeting faces are formed to clamp between them a flexible diaphragm 31 and to form a pressure chamber 32 on one side of this diaphragm and a valve chamber 33 on the other side of the diaphragm. The body 28 and cap 29 are further formed to clamp between them a second flexible diaphragm 34 of equal effective area with the diaphragm 31. One side of this diaphragm 34 is subject to the pressure in the valve chamber 33. The outer side of the diaphragm 34 is subject to atmospheric pressure, because of the presence of an atmospheric vent 35 in the cap 29. The diaphragms are connected together by a spacer 36 which carries clamping discs embracing the central portions of the two diaphragms 31 and 34. A nut 37 by collision with a boss 38 formed in the chamber 32 limits the inward (right hand in the drawing) motion of the member 36, and a coil spring 39 urges the member 36 toward the boss 38.

It will be observed that since the areas of the diaphragms 31 and 34 exposed to pressure in the valve chamber 33 are equal, the position of the member 36 is not affected by pressure in the chamber 33. The spring 39 is of such strength as to resist a pressure of approximately ten pounds gage acting on the effective area of the diaphragm 31.

Formed in the body 28 within the valve chamber 33 is a valve seat 41 having a port 42. This port is controlled by a slide valve 43 closely confined in a notch in the stem 36 and urged to its seat by a coiled compression spring 44. The port 42 is exposed by the valve 43 when the stem 36 is in its right hand position, and is closed by the valve when pressure acting on the right of diaphragm 31 overpowers spring 39 and moves the stem 36 outwardly (i. e., to the left).

The brake cylinder passage is shown at 45 and leads to the brake cylinder port 46 in the seat of slide valve 21. It also has a branch which leads to the chamber 32 on the inner or right hand side of diaphragm 31. The exhaust port is generally indicated by the numeral 47. A quick service chamber port is shown at 48 and is connected by a passage with the quick service chamber 26. The port 49 formed in the seat of slide valve 21 is connected through a check valve 51 with the port 42 in the seat 41. The check valve is mounted in a removable screw plug 52 and permits flow through the port 49 in a direction away from the triple slide valve seat and toward the chamber 33.

The brake pipe port 53 also formed in the seat for slide valve 21 communicates directly with the brake pipe passage 25. The valve chamber 33 is connected by a passage 54 with the space to the right of the piston 16, and consequently, with the auxiliary reservoir. It follows that the valve chamber 33 is at all times subject to auxiliary reservoir pressure.

The slide valve 21 has a service port 55 leading to the lower face of the valve and terminating in the upper face of the valve in two branches, namely, a main service branch 56 and a restricted service branch 57. In service and service lap positions, the port 55 registers with the brake cylinder port 46 and is out of register therewith in release position.

In the lower face of the slide valve 21 there is also an exhaust cavity 58 which, in release position only, connects the brake cylinder port 46 with the exhaust port 47. In the lower face of the slide valve 21 there is an elongated cavity 59 with an extension 61 leading to the seat of the graduating valve 22. The cavity 59 registers with the quick service chamber port 48 in release position and with the port 49 in service position and service lap positions.

A port 62 leading from the upper face of the slide valve 21 and controlled by the graduating valve 22 has two branches 63 and 64 on the lower face of the valve. The branch 64 registers with the brake pipe port 53 in release position only. The branch 63 registers with the brake pipe port 53 in service position and both service lap positions. Graduating valve 22 is so dimensioned that in full service position it exposes both of the ports 56 and 57 (see Fig. 2), but in preliminary lap position, to which the triple valve moves with the assistance of the graduating stop 14, the graduating valve closes the port 56 and exposes the port 57 (see Fig. 3). In full lap position, in which the collar 19 has just engaged the slide valve 21, graduating valve 22 blanks both the ports 56 and 57 (see Fig. 4). The graduating valve 22 has a cavity 65 which connects the ports 61 and 62 in full service and preliminary lap positions, the ports being isolated from each other in release and full lap positions.

The operation of the embodiment above described is as follows: The charging of the auxiliary reservoir takes place through the charging groove 11 in the usual manner and need not be described.

Assuming that a train of cars equipped with triple valves of the type described is fully charged and that a service reduction of brake pipe pressure is made at the engineer's brake valve, the resulting reduction of pressure to the left of the piston 16 would cause the piston to move outwardly (to the left) under the urge of superior auxiliary reservoir pressure.

The initial movement of piston 16 and graduating valve 22 results in the connection of the ports 61 and 62 by the cavity 65. Brake pipe air flows from passage 25 through ports 53, 64, 62, 65, 61, cavity 59 and port 48 to the quick service chamber 26. The resulting sharp reduction of brake pipe pressure insures the complete travel of piston 16 until it seats upon the gasket 13 with the spring 15 compressed. This is full service position (Fig. 2). This action will run through to the rear end of the train being accelerated by the quick service venting. The venting will persist at the capacity of the choke 27 until the slide valve 21 is shifted from release position at which time the port 48 will be blanked.

In service position the exhaust port is blanked and service ports 56 and 57 are fully exposed, with the port 55 in register with the brake cylinder port 46.

In full service position, cavity 59 registers with port 49, port 63 registers with port 53 and cavity 65 connects ports 62 and 61. Consequently, there is a free passage for brake pipe air to the check valve 51, but, so long as auxiliary reservoir pressure which is present in the valve chamber 33 predominates, check valve 51 will not open.

In full service position, auxiliary reservoir pressure is falling and brake cylinder pressure is being built up. Since the brake cylinder pressure acts directly on the right hand side of diaphragm 31, and, since the spring 39 is set to resist a definite pressure, here assumed to be ten pounds gage, the valve 43 will move to the left and blank port 42 as soon as the assumed pressure of ten pounds gage is attained in the brake cylinder. If sufficient air is fed from the auxiliary reservoir to the brake cylinder to establish this ten pounds gage pressure, valve 43 blanks port 42, but, in valves at the end of the train, if the auxiliary reservoir is insufficiently charged, the assumed pressure of ten pounds may never be reached as a result of flow from the auxiliary reservoir. In such case, valve 43 stays to the right, exposing the port 42, so that when auxiliary reservoir pressure drops to equality or approximate equality with brake pipe pressure, the graduating spring 15 will shift the graduating valve 22, so that the parts assume preliminary lap position (Fig. 3), in which only the restricted service port 57 is exposed. Under these conditions, auxiliary reservoir pressure will continue to fall and, falling below brake pipe pressure, will immediately cause flow of brake pipe air from the brake pipe passage 25 through ports 53, 63, 62, 65, 61, cavity 59, port 49, check valve 51, port 42 to the chamber 33 which, as explained, is in direct communication with the auxiliary reservoir.

It is important to note that the graduating spring assists in shifting the triple valve far enough to restrict service flow but not terminate it and the restriction establishes a rate of service flow such that the feeding flow from the brake pipe to the auxiliary reservoir will prevent the triple valve from moving to full lap position until the brake cylinder pressure has been brought to the assumed minimum value of ten pounds, at which time the valve 43 will move and close the port 42.

With the by-pass passage through the check valve 51 closed and the restricted port 57 still open, auxiliary reservoir pressure will be reduced by flow to the brake cylinder below brake pipe pressure, and the resulting pressure differential on piston 16 will shift the triple valve to full lap position (Fig. 4). In full lap position the service port is closed and the ports 61 and 62 are isolated from each other and blanked. Consequently, even if leakage from the brake cylinder should reduce brake cylinder pressure below the assumed minimum value of ten pounds, after the triple valve has moved to full lap position, there can be no flow from the brake pipe to the auxiliary reservoir and brake cylinder. If such flow could occur, the triple valve would be sluggish in its releasing movement, and the fact that it cannot occur, after the stated minimum brake cylinder pressure has been once established, is an important characteristic of the present invention.

From a consideration of the above operative characteristics, the important features of novelty in the present invention can readily be appreciated. One, any triple valve whose reservoir has been adequately charged will apply its brake on the initial service graduation solely by flow from the auxiliary reservoir to the brake cylinder. Two, any triple valve whose auxiliary reservoir has been inadequately charged will first feed air from the auxiliary reservoir to the brake cylinder until equalization between brake pipe and auxiliary reservoir pressure is approached. From then on until the determined minimum brake cylinder pressure has been established, the valve will remain in preliminary lap position in which a very restricted flow from the brake pipe to the brake cylinder occurs. When the desired minimum brake cylinder pressure has been established by such flow from the brake pipe, the flow is terminated, establishing a condition under which the triple valve must move promptly to full lap position. Three, such motion to full lap position precludes the resumption of flow from the brake pipe to the auxiliary reservoir and brake cylinder, even though the pressure in the brake cylinder be lost by leakage. From this it follows that when the triple valve is once in full lap position, its releasing action will not be impaired by flow from the brake pipe to the auxiliary reservoir or brake cylinder.

While the mechanism described for accomplishing these functions is believed to be simple and satisfactory, it is subject to modification without departure from the essential principles of the invention.

What is claimed is:—

1. The combination of an automatic brake valve adapted for connection with a brake pipe, brake cylinder and a reservoir and including a movable abutment and valve means operable thereby and controlling admission and exhaust of pressure fluid to and from the brake cylinder, said abutment responding to pressure differential between brake pipe and auxiliary reservoir and serving to move said valve means from release position to application position upon reduction of brake pipe pressure, and thereafter to lap position upon approximate equalization of said pressures; means responsive at least in part to approach to equalization between brake pipe and reservoir pressures during an application and serving to establish a restricted flow connection from brake pipe to brake cylinder; means responsive to rising brake cylinder pressure to close such connection; and means rendered effective by the termination of flow through such connection toward the brake cylinder to preclude restoration of such flow by the means responsive to rising brake cylinder pressure.

2. The combination defined in claim 1, in which the means responsive to rising brake cylinder pressure comprises a slide valve, a movable abutment connected to actuate the same and subject to brake cylinder pressure, and yielding means resisting the closing movement of such valve.

3. The combination defined in claim 1, in which the means responsive to rising brake cylinder pressure comprises a valve chamber interposed between two spaced movable abutments and subject to reservoir pressure, and operative connection between said abutments, a valve arranged to be actuated by such operative connection, means subjecting one of said abutments to brake cylinder pressure acting in a valve-closing direction, and yielding means resisting the motion of said valve in a closing direction.

4. The combination defined in claim 1 in which the means responsive to rising brake cylinder pressure comprises a valve chamber interposed between two spaced movable abutments of approximately equal effective areas connected to move in unison, a valve arranged to be shiftable by said abutments and controlling flow through said chamber from brake pipe to said reservoir; means subjecting one of said abutments on its outer face to brake cylinder pressure and the other abutment on its outer face to atmospheric pressure, and yielding means resisting motion of such valve in a closing direction.

5. The combination of an automatic brake valve adapted for connection with a brake pipe, brake cylinder and a reservoir and including a movable abutment and valve means operable thereby and controlling admission and exhaust of pressure fluid to and from the brake cylinder, said abutment responding to pressure differential between brake pipe and auxiliary reservoir and serving to move said valve means from release position to application position upon reduction of brake pipe pressure, and thereafter to lap position upon approximate equalization of said pressures; means responsive at least in part to approach to equalization between brake pipe and reservoir pressures to establish a restricted flow connection from brake pipe to brake cylinder; means responsive to rising brake cylinder pressure to close such connection; and means effective in the lap position of the brake valve to inhibit such feeding flow.

6. The combination defined in claim 5, in which the means effective in the lap position of the brake valve comprises ports controlled by the brake valve.

7. The combination defined in claim 5, in which the valve means forming part of the brake valve includes a slide valve and a graduating valve shiftable relatively to each other, and the means effective in the lap position of the brake valve comprises ports in the slide valve controlled by the graduating valve.

8. The combination of an automatic brake valve adapted for connection with a brake pipe, brake cylinder and reservoir and including an abutment responsive to pressure differentials between the brake pipe and reservoir and a valve actuated by said abutment, said valve having service and lap positions, and a partial lap position between service and lap positions, in which partial lap position a restricted flow connection is open between said reservoir and brake cylinder; graduating means serving during an application to shift the brake valve to such partial lap position when reservoir and brake pipe pressures approximately equalize; means establishing a restricted one-way feed connection from the brake pipe to the reservoir when the brake valve is in said partial lap position, said connection being closed in lap position of the brake valve; and means for closing said feed connection in response to the attainment of a definite brake cylinder pressure.

9. The combination defined in claim 8, in which the means for closing said feed connection comprises a diaphragm-actuated slide valve.

10. The combination of an automatic brake valve adapted for connection with a brake pipe, brake cylinder and reservoir and including an abutment responsive to pressure differentials between the brake pipe and reservoir and a valve actuated by said abutment, said valve having service and lap positions, and a partial lap position between service and lap positions; means providing a by-pass feeding passage from the brake pipe to the reservoir; and a plurality of means exercising valvular control on flow through said passage, one of said means precluding back flow from the reservoir to the brake pipe at all times, another of said means serving to close said passage upon attainment of a definite brake cylinder pressure, and another of said means comprising ports in the brake valve itself and serving to open said passage in the preliminary lap position and close it in lap position.

11. The combination defined in claim 10, in which the valve element of the brake valve includes a slide valve and a graduating valve movable relatively to each other to control service flow from the reservoir to the brake cylinder, and the means comprising ports in the brake valve itself exercises its control by motion of the graduating valve relatively to the slide valve.

12. The combination of an automatic brake valve adapted for connection with a brake pipe, brake cylinder and reservoir; means rendered effective by approach to equalization between reservoir and brake pipe pressures after a service reduction of brake pipe pressure to establish a restricted feeding flow from brake pipe to brake cylinder; means responsive to the attainment of a definite brake cylinder pressure to prevent such flow or terminate it if it has commenced, as the case may be; and means effective in the lap position of the brake valve to preclude such flow.

13. The combination defined in claim 12, in which the brake valve includes a slide valve and a graduating valve movable relatively one to the other to control service flow from the reservoir to the brake cylinder, and the means effective in the lap position of the brake valve to preclude the stated flow comprises at least one port in the slide valve controlled by the graduating valve.

14. The combination of a triple valve adapted for connection with a brake pipe, brake cylinder and auxiliary reservoir and having release, service and lap positions; a restricted by-pass passage from the brake pipe to the auxiliary reservoir; means comprising ports in the triple valve arranged to open said passage in service position and to close said passage in the lap position of the triple valve; a pressure-actuated valve also controlling said passage and responsive to brake cylinder pressure, the last-named valve serving to close said passage upon the attainment of a definite brake cylinder pressure; and means comprising ports in the triple valve, and rendered effective by approach to equalization of auxiliary reservoir and brake pipe pressures, after a service reduction of brake pipe pressure, to delay lapping motion of the triple valve while said pressure-actuated valve is open.

15. The combination of a triple valve adapted for connection with a brake pipe, brake cylinder and auxiliary reservoir; means effective upon an initial service reduction of brake pipe pressure to ensure the development of at least a chosen minimum brake cylinder pressure, said means comprising a by-pass from the brake pipe to the brake cylinder controlled by the triple valve and closed thereby in lap position; and means responsive to the development of such minimum brake cylinder pressure to close said by-pass.

16. The combination of a triple valve adapted for connection with brake pipe, brake cylinder and auxiliary reservoir; means effective upon an initial service reduction of brake pipe pressure to ensure the development of at least a chosen minimum brake cylinder pressure, said means comprising a by-pass from the brake pipe to the brake cylinder controlled by the triple valve and closed thereby in lap position; means responsive to the development of such minimum brake cylinder pressure to close said by-pass; and means delaying the motion of the triple valve to lap position until the last-named means has functioned.

CHARLES A. CAMPBELL.